United States Patent [19]
Krieg et al.

[11] Patent Number: 5,065,014

[45] Date of Patent: Nov. 12, 1991

[54] ROTATION ANGLE MEASURING WITH OVERLAP AREA IS BETWEEN TWO OPTICAL GRATING AXES

[75] Inventors: Gunther Krieg; Werner Helget, both of Karlsruhe; Bertold Deppisch, Pfinztal, all of Fed. Rep. of Germany

[73] Assignee: Gunther Krieg, Karlsruhe, Fed. Rep. of Germany

[21] Appl. No.: 487,101

[22] Filed: Mar. 2, 1990

[30] Foreign Application Priority Data

Mar. 3, 1989 [DE] Fed. Rep. of Germany ....... 3906777

[51] Int. Cl.[5] ............................................. H01J 40/14
[52] U.S. Cl. ......................... 250/237 G; 250/231.1 H; 356/37 H
[58] Field of Search ..................... 250/237 G, 231.1 H, 250/231.16; 356/374

[56] References Cited

U.S. PATENT DOCUMENTS 3,944,821  3/1976  Pierrat ........................... 250/237 G

FOREIGN PATENT DOCUMENTS 0623103  7/1978  U.S.S.R. .............................. 356/374

OTHER PUBLICATIONS

Shunsuke Yokozeki—Optics Communications—vol. 11, No. 4 Aug. 1974.

*Primary Examiner*—Davis L. Willis
*Assistant Examiner*—Que T. Le
*Attorney, Agent, or Firm*—Antonelli, Terry Stout & Kraus

[57] ABSTRACT

A method and apparatus for measuring a rotation angle. At least one rotatable optical grating is provided to be pivotal on a rotation axis relative to one or more slits parallel to the rotatable optical grating. The rotatable optical grating is radial to the rotation axis. To measure a rotation angle the rotatable optical grating is pivoted relative to at least one stationary optical grating which is radial to a center opposite to a center of the rotatable optical grating. An overlap area is defined between the two optical gratings and measurement of the relative movement between the rotatable optical grating and the stationary optical grating is detected by at least one photoelectric receiver.

22 Claims, 10 Drawing Sheets

Diagram 6.1 — Voltage at output of 37, Voltage of C1, Voltage of C2

Diagram 6.1

Diagram 6.3

Diagram 6.4

Analog signal of outer rhomboid

Rotation direction/right

Rotation direction/left

ROTATION ANGLE MEASURING WITH OVERLAP AREA IS BETWEEN TWO OPTICAL GRATING AXES

BACKGROUND OF THE INVENTION

1. Technical Field

The invention relates to a method for measuring a rotation angle, in which at least one optical grating radial with respect to the rotation axis is pivoted relative to one or more slits parallel thereto, as well as to a rotation angle measuring device having at least one pivotable, radial, optical grating, through whose center passes a rotation axis, whose angular position is to be measured and with one or more slits positioned upstream of the optical grating.

2. Description of Prior Art

Optical rotation angle measuring devices of the aforementioned type are known per se. They have radial, optical gratings pivotable about the center thereof and one or more slits positioned upstream of the same. The known rotation angle measuring devices make high demands. Thus, they are sensitive to environmental influences, expensive and not suitable for mass use. Due to the diffraction effects, their resolution is also greatly limited, because these effects are noticed in the range of a few $\mu$m in the case of line structures. Very high demands are also made on the axial setting precision and the other geometrical parameters. Such rotation angle measuring devices are required for measuring the accelerator position in vehicles equipped with a catalyst in order to optimize the action thereof. Thus, angular precisions of a few hundredths of a degree are required. Obviously in such cases an inexpensive mass product is needed, but this must be as insensitive as possible to external disturbing influences.

SUMMARY OF THE INVENTION

The present invention solves the above described problems by providing a method for measuring rotation angles and a rotation angle measuring device, which permit an inexpensive rotation angle measurement, whilst being very insensitive to external influences, which make few demands and have limited manufacturing tolerances, whilst still allowing a high resolution and therefore measuring precision of the rotation angle position.

According to the invention the problem is solved in the case of a method of the aforementioned type in that the rotary optical grating is pivoted relative to at least one stationary optical grating also radial to another center and whose center relative to the overlap area of the optical gratings is on the other side of the rotation center of the first optical grating. A rotation angle measuring device according to the invention has at least one second radial grating arranged in a plane parallel to that of the first optical grating and with an overlap area of both gratings, the center of the two optical gratings being in each case located on different sides of the overlap area.

According to preferred further developments the center of the overlap area defined by the connecting axis of the two centers of the two gratings is illuminated by at least one light source, e.g. a LED and is observed by a photoelectric receiver or photocell and that the electrical output signals of the photoelectric receiver are digitized. The digital pulses received are in particular summed up to the determination of the end position of the measuring rotary movement. According to further developments the digital pulses are produced by peak values of the output signals of the photoelectric receiver, the digital pulses are produced by Schmitt triggers establishing clearly defined values of the output signals of the photoelectric receiver and the optical gratings can be identically constructed if they also have fundamentally differing grating constants.

According to a preferred development of the inventive rotation angle measuring device, above the overlap areas of the optical gratings is positioned a diaphragm, whilst photoelectric receivers can also be positioned above the overlap area of the optical gratings. According to further inventive developments the photoelectric receiver is followed by evaluation electronics and/or the latter is provided with a device for deriving digital signals from the output signal of the photoelectric receiver.

In a further development, peak value detectors follow the photoelectric receiver. One or more peak value detectors can carry out a first digitization of the analog, sinusoidal signal received.

In order to improve the resolution and determine the rotation direction of the rotation angle measuring device, further developments are characterized in that another grating coaxial to a first grating is provided and is asymmetrically displaced with respect to said grating, is pivoted synchronously with the first grating relative to the other second grating or in addition to one optical grating is provided a further optical grating positioned coaxially thereto, but which is asymmetrically angularly displaced relative thereto. Thus, apart from an outer line ring there is an additional inner line ring. In particular, the further grating can lead or follow by a $\frac{1}{4}$ line spacing with respect to the grating coaxial thereto or the two coaxial line gratings are reciprocally displaced by a $\frac{1}{4}$ line spacing. Thus, for an assumed line spacing of 0.2°, the two line rings have a line displacement of 0.05°, the lines of the inner line ring following by 0.05°, or leading with respect to the outer line ring. The two line rings are covered by the same line ring segment of the other grating located in a parallel plane, so that two superimposed half-rhomboids are formed. As a function of the reciprocal displacement of the line rings, the two half-rhomboids have a displacement of their brightness states of 0.05°. For determining the brightness changes of the rhomboids, the detection electronics must be separately constructed for each half-rhomboid. In a following common electronics, the signals of the detection branch are brought together and the digital pulses are generated for counting the angle steps and the rotation direction.

According to another preferred development, the optical line markings (3,4) are formed on glass supports, the structures being produced by etching or by lithographic processes, with a preferred application of $CrO_2$.

BRIEF DESCRIPTION OF THE DRAWINGS

Further advantages and features of the invention can be gathered from the claims and the following description of a non-limitative embodiment with reference to the attached drawings, wherein show:

DETAILED DESCRIPTION OF THE PREFERRED EMBODIMENTS

Figure 1:
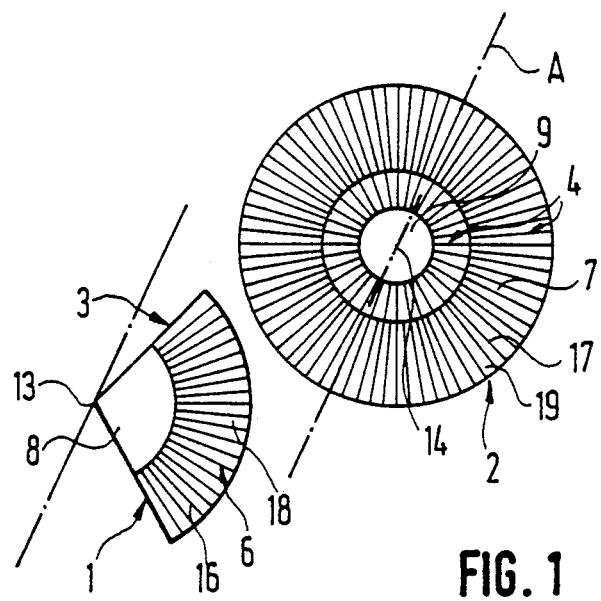
FIG. 1 an arrangement of the overlapping line rings in an exploded view.
Figure 2:
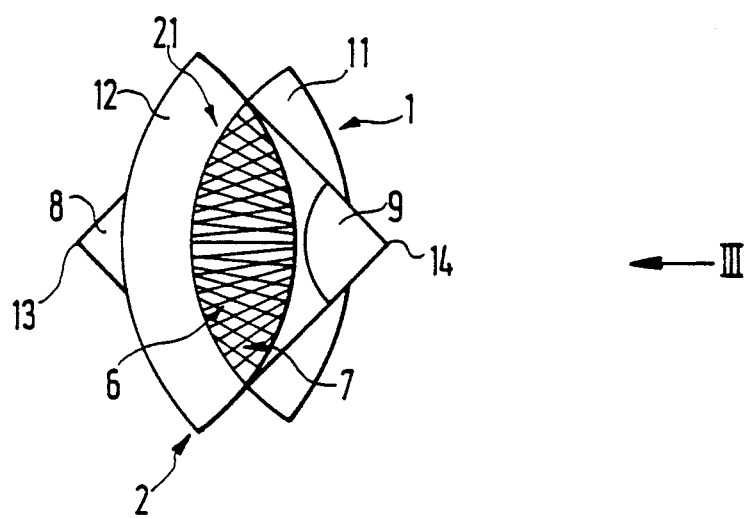
FIG. 2 a plan view of directly succeeding line rim portions.

According to the invention FIGS. 1 and 2 illustrates that two disks 1,2 are provided, which have the ring areas 3,4 a line ring portion 6 or a complete line ring 7. The central area 8,9 is blacked out in the same way as a marginal area 11,12 (FIG. 2; not shown for reasons of clarity in FIG. 1). For reasons of clarity, the surface blacking of areas 8,9,11,12 is not shown. The representation of FIGS. 1 and 2 can be considered as a negative representation of the disks 1,2 used.

The line ring portions 6,7 have a plurality of lines 16,17 emanating radially from centers 13,14 with intermediate transparent gaps 18,19 or vice versa. The angle period of the lines 16,17 is 0.2° in a preferred embodiment, i.e. the angular spacing from the start of a line is 0.2°. Although the ratio of line thickness and internal spacing between two lines is not critical and can vary to a minor extent, preferably the ratio is 1, because as a result an optimum contrast can be obtained between angular positions turned by a half period and therefore a high useful signal. The radial dimensions of the disks are a few centimeters and preferably less than 3 cm. The line spacings can then be a few hundredths of a millimeter or a few micrometers, disturbing diffraction phenomena being avoided due to the spacing of the lines of a disk.

It is important that the overlap area 21 of the line patterns 6,7 of the two disks 1,2 is located between the centers 13,14 of the disks. One of the disks, in the embodiment according to FIG. 1 the full circular disk 2, rotates about an axis A passing through its center 14.

Figure 3:
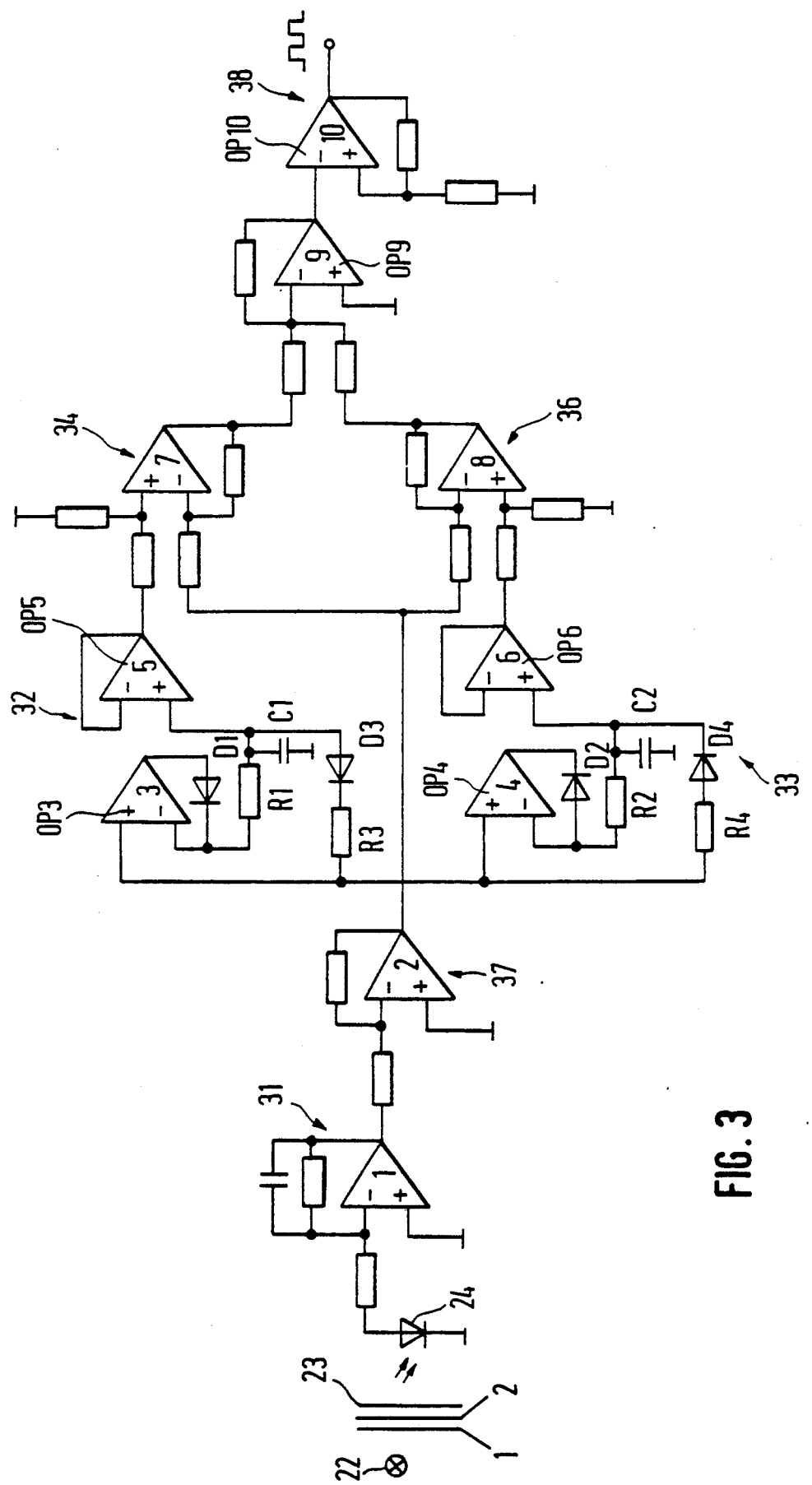
FIG. 3 a side view corresponding to III in FIG. 2 with the light source and photoelectric receiver, as well as the following electronic circuit.

FIG. 3 illustrates that a light source 22 for illumination purposes is positioned upstream of the arrangement of the two disks 1,2. On one side of the disks 1,2 is located a diaphragm 23, which only permits the passage of light in a central area located on the connecting axis of the two centers 13,14, but the setting is not critical. Behind the disks 1,2 (viewed from light source 22) is provided a photoelectric receiver or photocell 24, to which is connected processing electronics having a current-voltage converter 31 for converting the photocurrent into a voltage, peak value detectors or memory circuits 32,33 and differential amplifiers (FIG. 3).

The brightness changes of the overlap area 21 in the form of a rhomboid are detected by the photodetector 24, such as a photosensor or a photodiode. The following operational amplifier is connected as a current-voltage converter 31 through the resistor and capacitor connected in parallel in the branch leading back in its negative input. A d.c. voltage on which is superimposed an a.c. voltage is applied to the output of the current-voltage converter 31. The d.c. voltage fraction is due to the fact that the blacking out in the overlap area 21 does not fill the complete detection gap and consequently a basic brightness is still detected by the receiver. The a.c. voltage results from the relative pivoting of the line ring disks 1,2 with respect to one another, so that there is a change to the brightness of the overlap area. Relatively large mechanical manufacturing tolerances can be allowed. Thus, the rhomboidal overlap area can migrate from the detection slit area, which leads to a change to the d.c. voltage fraction and to a change in the a.c. voltage amplitude. These can be taken into account by the following inventive circuit. However, in the case of relatively large manufacturing tolerances, it is not possible to use a fixed threshold value for the digitization of the a.c. voltage. If such an evaluation is to be carried out, then the manufacturing tolerances must be relatively small.

The current-voltage converter 31 is followed by an inverting amplifier 37, by returning the output to the negative input across a resistor. Through the latter the gain is chosen in such a way that an a.c. voltage with an amplitude in a predetermined range, e.g. 1.5 V is obtained. Its extremes are determined by the following memory circuits 32,33 having the operational amplifiers OP3 to OP6. The positive inputs of operational amplifiers OP3, OP4 follow the output of amplifier 37. The outputs of operational amplifiers OP3, OP4 are connected in each case across a diode D1, D2 and a resistor R1, R2 to a charging capacitor C1, C2, the diodes D1, D2 being positioned relative to their associated operational amplifiers OP3, OP4. The connection of capacitor C1, C2 connected to the output of operational amplifiers OP3, OP4 is connected across correspondingly differently arranged diodes D3, D4 and resistors R3, R4 to the output of amplifier 37.

The voltages of the charging capacitors C1, C2 are applied across impedance converters OP5 and OP6 to the positive inputs of differential amplifiers 34, 36, to whose negative inputs are applied the output of amplifier 37. The operational amplifier OP9 adds the two output voltages of the differential amplifiers 34, 36, so that the desired a.c. voltage without a d.c. voltage fraction is obtained at the output of operational amplifier OP9. Operational amplifier OP10 functions as a Schmitt trigger 38 and produces a square-wave voltage with values of approximately 75% of the positive and negative maxima of the a.c. voltage of amplifier 37.

Figure 8:
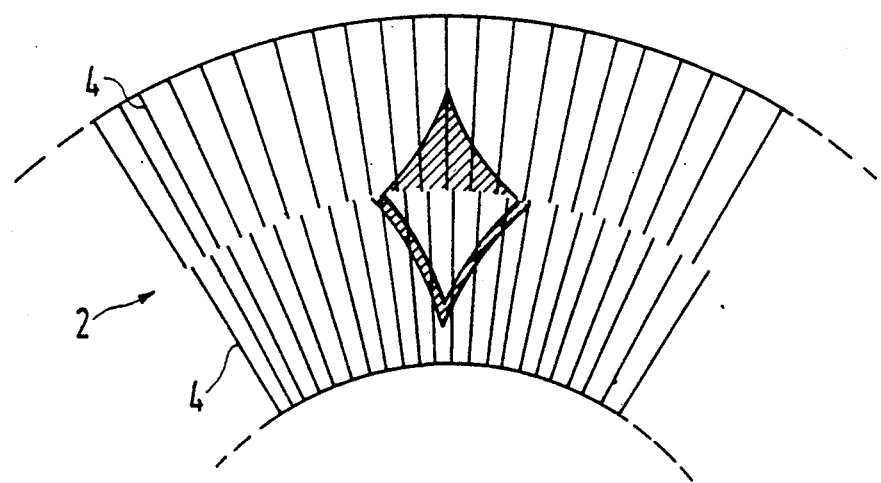
FIG. 8 a diagrammatic view of the half-rhomboids in the case of concentric outer and inner line gratings according to FIG. 1.
Figure 9:
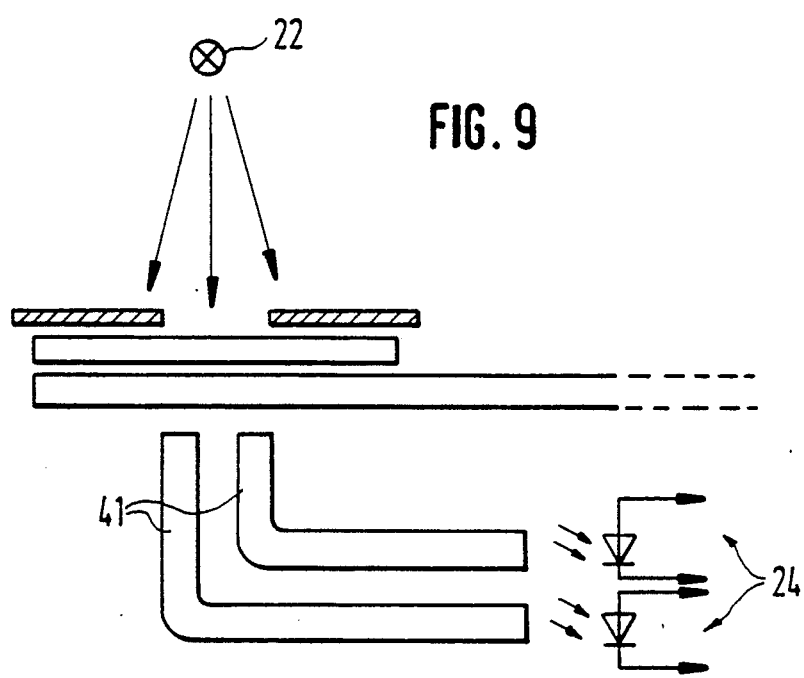
FIG. 9 an observation arrangement for FIGS. 1 and 8 with light guides.

If there are two concentric optical line gratings on a disk 1,2, which are angularly asymmetrically reciprocally displaced, e.g. by a ¼ line spacing, then a detector must be associated with each grating on the disk and is in each case followed by the described electronic circuit (FIGS. 1, 8).

Figure 4:
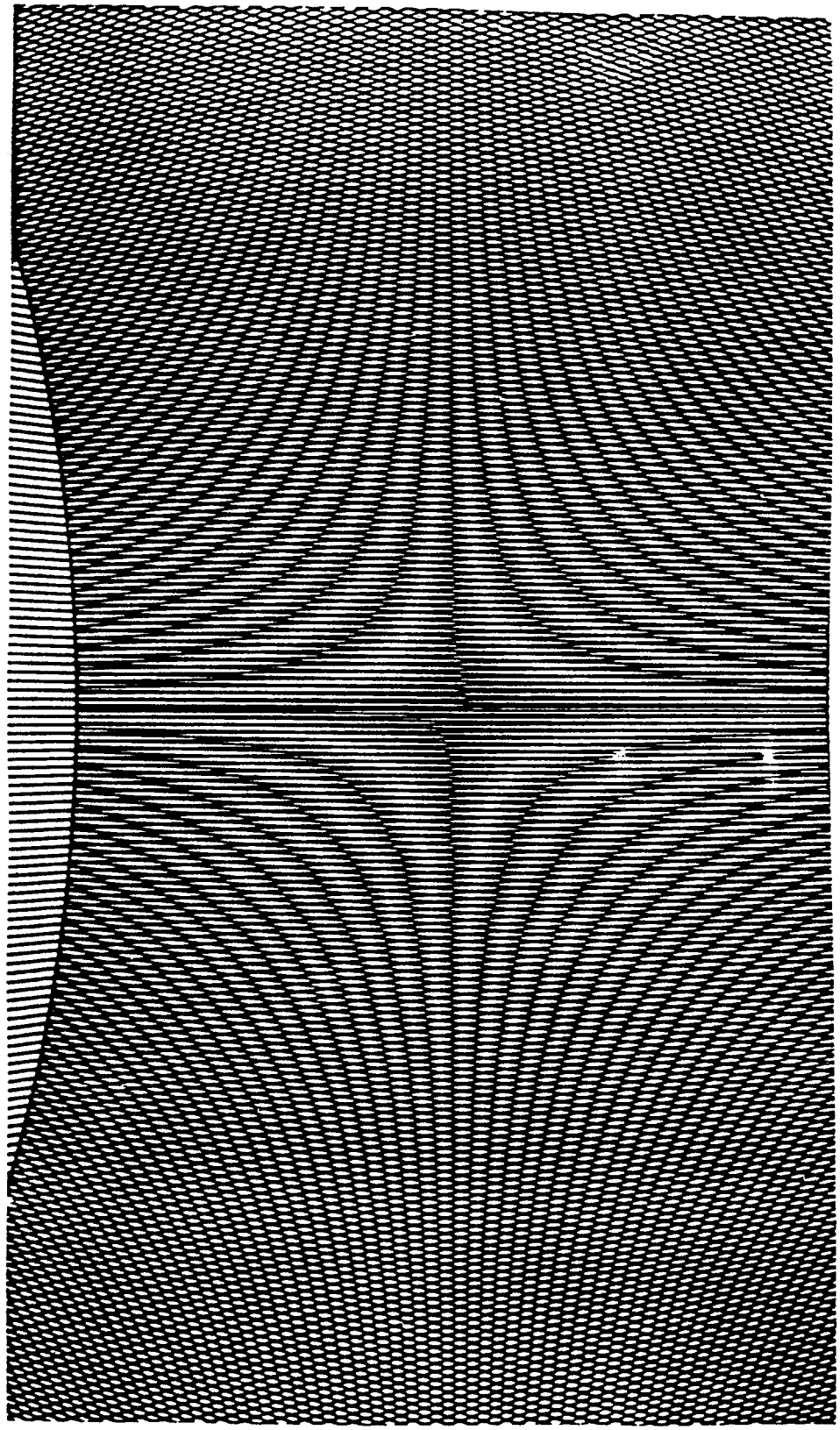
FIG. 4 two succeeding line ring areas with blacking out in the center.
Figure 5:
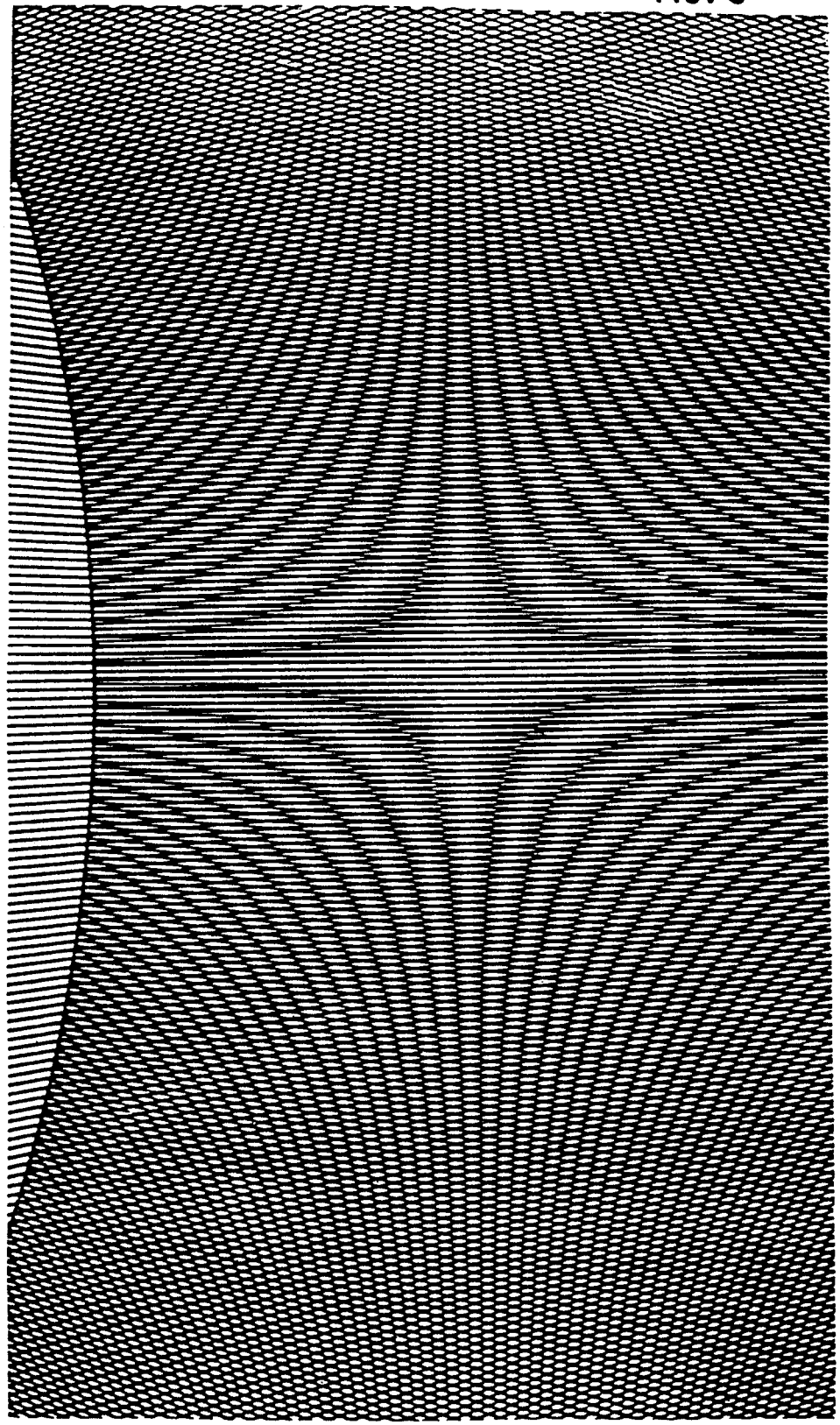
FIG. 5 corresponding to FIG. 4 on rotating one line ring portion with respect to the other by a half period of the arrangement with a resulting lighting up of the central area.
Figure 6A:
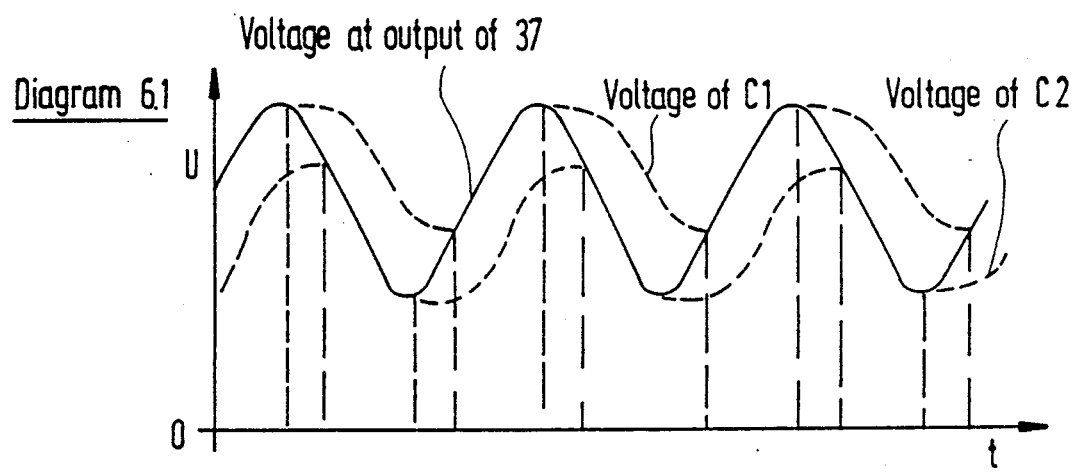
FIGS. 6a, 6b, 6c, and 6d diagrams of the signals obtained during the electronic evaluation of images obtained according to FIGS. 4 and 5 through the circuit of FIG. 3.
Figure 6B:
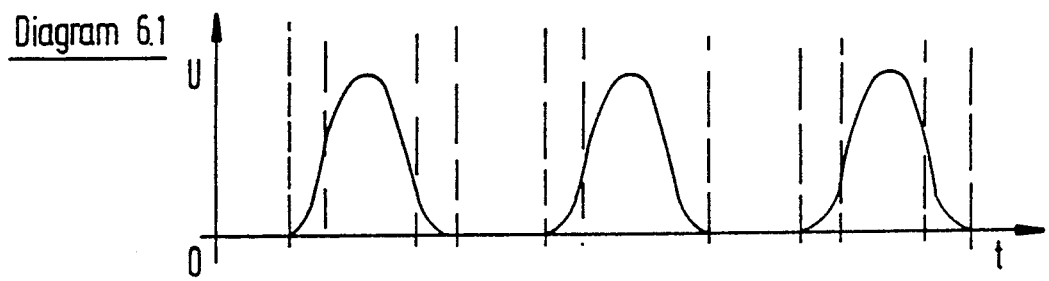
Figure 6C:
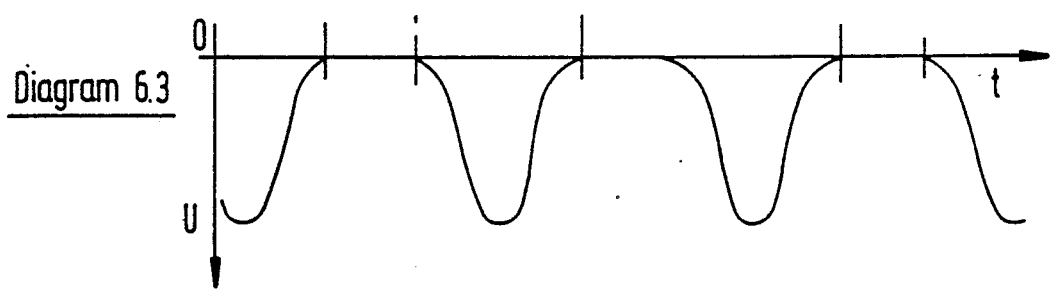
Figure 6D:
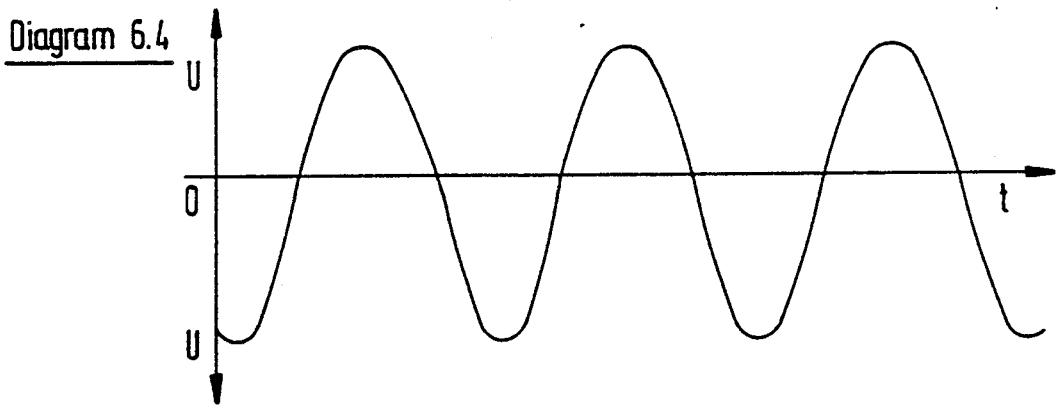
Figure 7A:
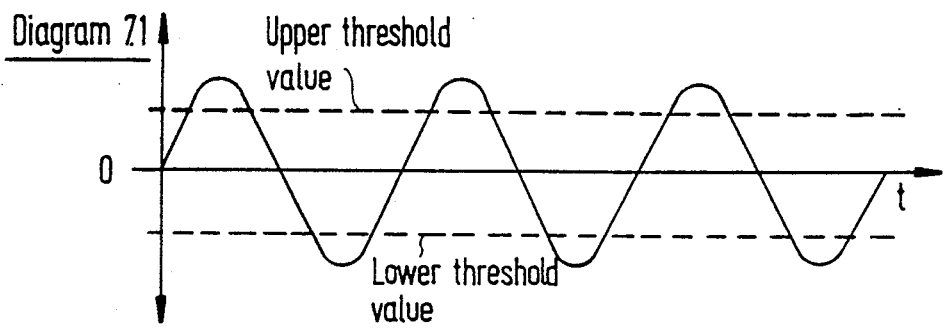
FIGS. 7a, 7b, 7c, 7d, 7e, and 7f diagrams of the signals obtained in the case of a disk with a ¼ line spacing of displaced concentric outer and inner line gratings.
Figure 7B:
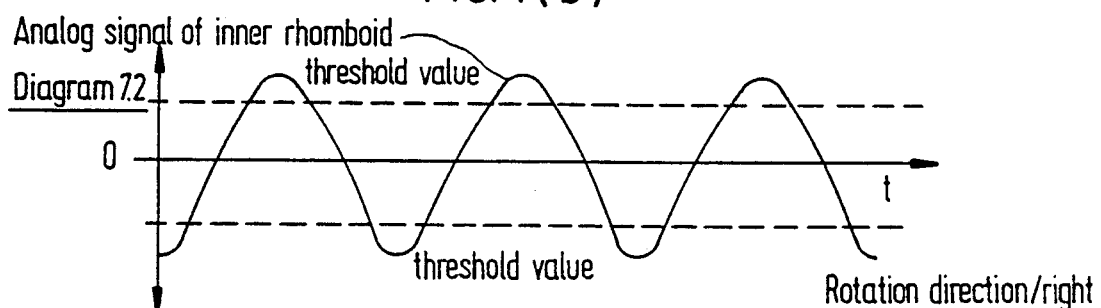
Figure 7C:
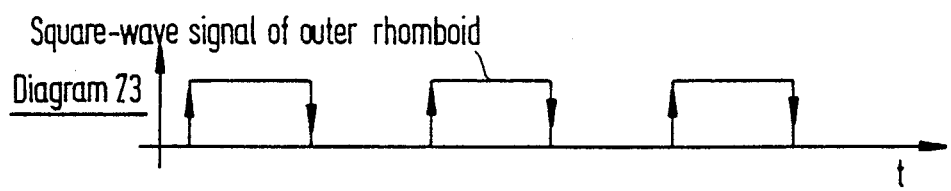
Figure 7D:
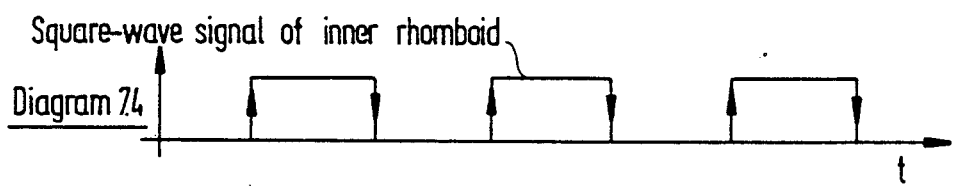
Figure 7E:
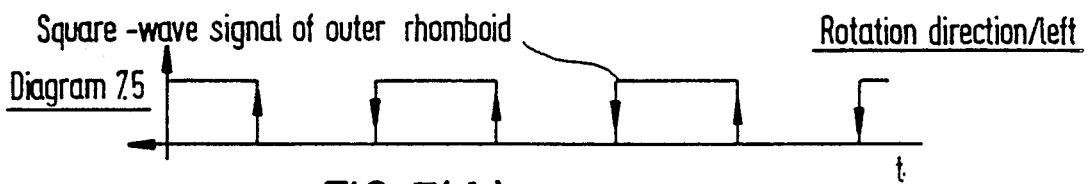
Figure 7F:
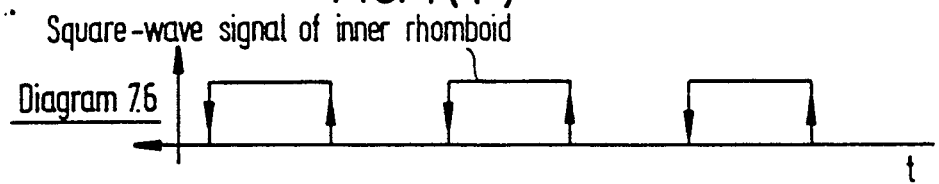

As a result of the described series arrangement of the two disks 1,2 with an overlap area 21 between their centers 13,14, a rhomboid pattern in the center is obtained on illumination, as can be seen in FIGS. 4 and 5. In the case of an angular positioning of the pivotable disks 2, in the center of the rhomboid arrangement, located in the aperture area of the diaphragm 23 and which is "seen" by the photoelectric receiver 24, a blacked out area occurs (FIG. 4). If the rotary disk 2 pivots its center axis A,14 over a half line period (i.e. in the case of a line period of 0.2 radian, over 0.1°), the center of the rhomboid pattern lights up, as shown in FIG. 5. This brightness change leads to a sinusoidal photocurrent superimposed on the d.c. voltage and which, as will be described hereinafter, can be electronically processed and evaluated.

The essential advantage of the inventive arrangement is that a high contrast macroscopic center with respect to the line patterns is obtained in the case of the described change to the angular position of the disks. Macroscopic center here means that this observed center has a biaxial, i.e. 4-fold axis of symmetry compared with a uniaxial black-white pattern. Thus, the inventive arrangement has much greater tolerances with respect to the setting and arrangement of the two centers of the disks 1,2, as well as diaphragm 23 and in addition this is not critical if prior to an angular adjustment of the pivotable disk 22, its starting position is initially determined as a zero value. As can be gathered from FIGS. 4 and 5, the brightness change of the central rhomboid can be easily detected and does not presuppose a precise adjustment of the line pattern.

The sinusoidal intensity and therefore photocurrent changes are converted by the current-voltage converter 31 into a sinusoidal a.c. voltage superimposed on a d.c. voltage and whose period corresponds to an angular change corresponding to the line pattern period, i.e. the distance from the leading edge of a line to the leading edge of the next line and in the present example 0.2 radian. The maxima and minima of the d.c. voltage superimposed sinusoidal voltage or the positive or negative maxima are detected by the memory circuits 32,33 or two peak value detectors.

For determining the a.c. voltage maximum, the operational amplifier OP3 charges the charging capacitor C1 across diode D1 and resistor R1 for as long as the output voltage of amplifier 37 applied to the positive input of OP rises. If the voltage at the positive input of operational amplifier OP drops below the voltage at the charging capacitor C1, diode D1 is blocked and the charging capacitor can initially undergo no further discharge. The maximum of the analog voltage remains stored at the charging capacitor C1 until the analog voltage has dropped by a specific amount, e.g. corresponding to up to half, i.e. approximately 0.7 V below the stored value. Diode D3 then becomes conductive and discharges capacitor C1 as a function of the amplitude of the analog voltage, so that the charging capacitor can recharge when the analog voltage again rises. Correspondingly the a.c. voltage minimum can be determined in the memory circuit 34 across operational amplifier OP4, diodes D2 and D4 and charging capacitor C2.

The differential amplifiers OP7 and OP8 connected downstream of memory circuits 32,33 across impedance converters OP5, OP6 and with the other input to amplifier 37 form the differences of the stored extremes to the instantaneously present voltage at the output of amplifier 37. Thus, there is only one voltage at the output of differential amplifier OP7, if the output voltage of the amplifier 37 is smaller than the stored maximum. Correspondingly OP8 only supplies a voltage if the analog voltage is higher than the stored a.c. voltage minimum. The difference of the voltages at capacitors C1, C2 with respect to the output voltage of amplifier 37 is shown in diagrams 6.2 or 6.3, as is apparent by a comparison with diagram 6.1. The two output voltages of differential amplifiers OP7, OP8 and therefore the voltages shown in diagrams 6.2 and 6.3 are subsequently added by adder OP9 to a a.c. voltage without d.c. voltage fraction (diagram 6.4).

FIG. 7 shows the following diagrams for the electronically derived voltage in the case of coaxially arranged optical gratings displaced by a ¼ line spacing. Diagram 7.1 shows the output signal of adder OP9 in FIG. 6.4 for a line grating, e.g. the outer line grating, whilst diagram 7.2 shows the corresponding d.c. voltage fraction-removed signal of the inner superimposed area. These signals are now fed to the Schmitt triggers OP10 which, if their input signal exceeds the upper threshold value, open their output and, if the input signal drops below the lower threshold value, closes the same, so as to thus produce the square-wave signals shown in diagrams 7.3 and 7.4.

The edge changes of the square-wave pulses are a measure for the number of traversed light and dark states of the rhomboid. In the case of an assumed line spacing of 0.2°, the resolution from the signal of a rhomboid is 0.1°. On adding the edge change of the square-wave pulses from the further rhomboid, there is a square-wave signal edge change every 0.05°, which corresponds to an angular resolution of 0.05°.

The relationship of the square-wave output signals of the outer and inner rhomboids give clear information on the instantaneous rotation direction. It can be gathered from diagrams 7.3 and 7.4, that the square-wave pulses of the outer rhomboid (diagram 7.3) lead by ¼ period those of the inner rhomboid (7.4).

On oppositely rotating the line disk (i.e. in the rotation direction 6 for the hitherto discussed diagrams to the left), then the Schmitt trigger OP10 for the inner rhomboid (diagram 7.10) reaches its switching point ¼ period before the Schmitt trigger for the outer rhomboid. In the same way the falling edge of the Schmitt trigger for the inner rhomboid leads the falling edge for the outer rhomboid. Thus, the outputs of operational amplifiers OP10 for the inner and outer rhomboids can be followed by a logic circuit for determining the rotation direction, as is known per se.

FIG. 8 shows how in the case of concentrically arranged, angularly displaced line gratings 1 on one disk 2 by superimposing with the line grating 3 of the other disk (not shown; FIG. 1) half-rhomboids are in each case formed on either side of the separating line of gratings 4, whereof one shows a dark field in the superimposed position with the other disk (the upper one in FIG. 8), whilst the center is light in the case of the other one. Particularly in the case of constricted space conditions both half-rhomboids must be discreetly observed by two detectors close to the separating line. In order to permit this in the case of small dimensions, they are positioned upstream of disks 1,2 on either side of the separating line between the line patterns 4 with their one faces, which are then passed to two detectors 24, which can therefore have a greater spacing. This permits a discreet detection of both half-rhomboids (as shown in FIG. 8).

Figure 10:
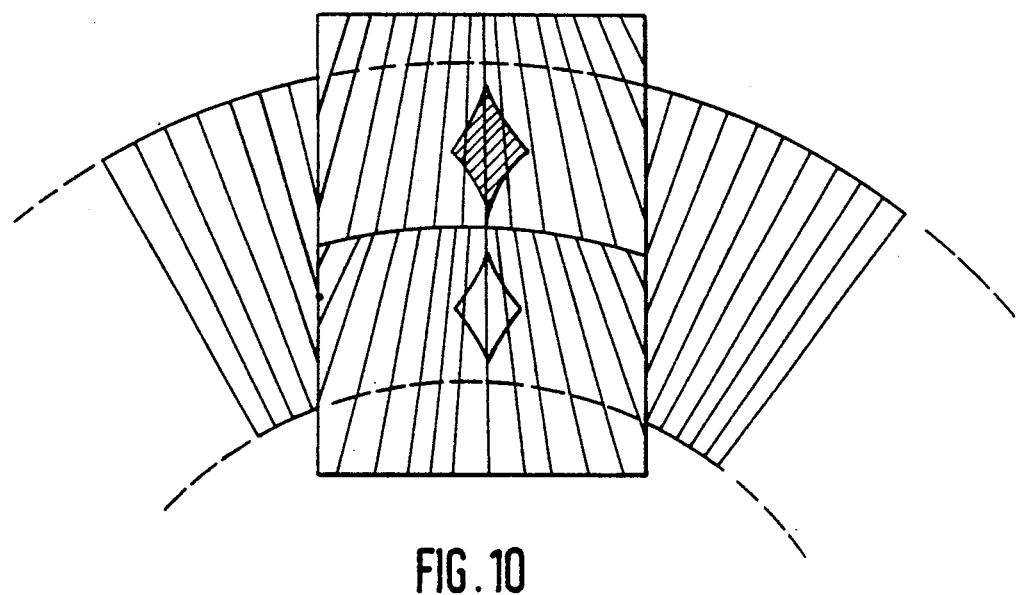
FIG. 10 an arrangement with two line ring segments superimposed on a disk and having radially displaced centres.
Figure 11:
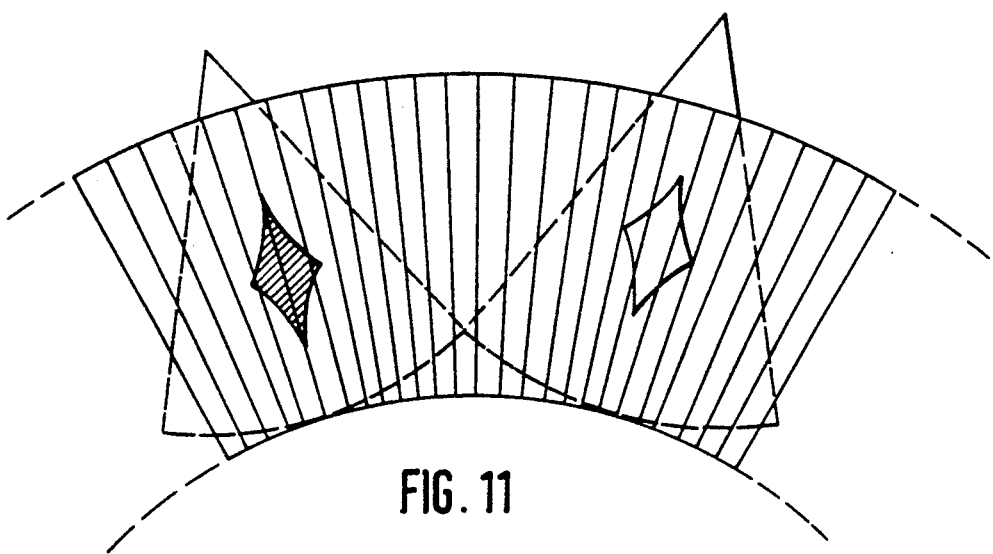
FIG. 11 an arrangement with two line ring segments juxtaposed on a disk with angularly displaced centers.

In place of a concentric arrangement of the optical line gratings on a disk with a common center and angular displacement, it is also possible to superimpose two line gratings on a disk with radially displaced centers, as shown in FIG. 10. There can also be two line gratings on a disk and their centers are then angularly displaced (FIG. 11).

Figure 12:
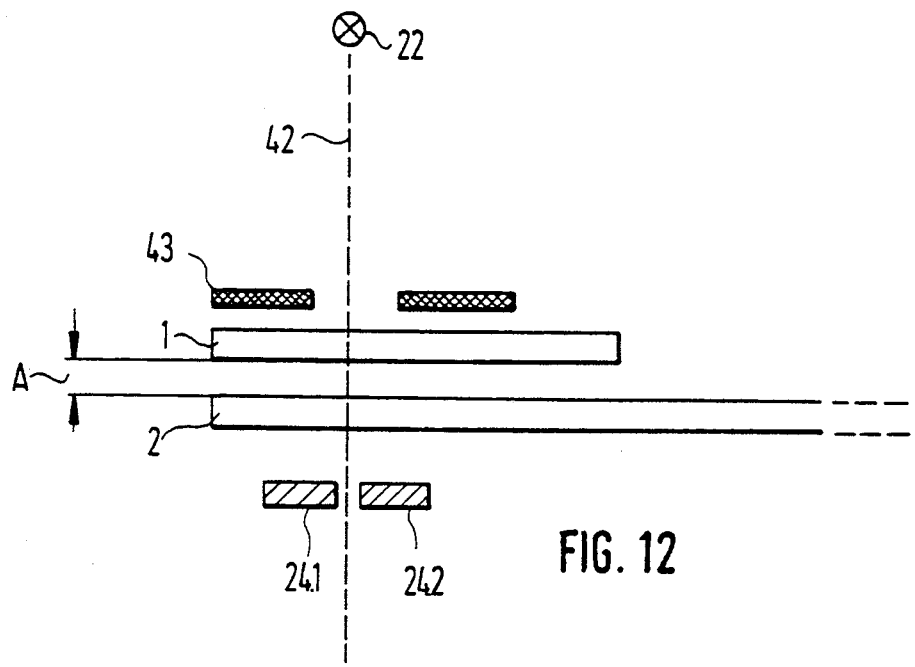
FIG. 12 an arrangement with line patterns having a vertical breakoff.

Another development of the method, in which in the case of one optical line grating on each of the reciprocally rotatable disks, also allows the rotation angle direction to be determined is shown in FIG. 12. The two disks 1,2 are reciprocally positioned with a finite vertical spacing A, which can be very small, namely in the 1/10 mm range, a preferred spacing being 0.25 mm. On the side of the two disks 1,2 facing the light source 22 two receivers 24.1 and 24.2 are displaced relative to the optical axis 42, which forms the vertical of light source 22 on disks 1,2. However, from their different positions, both receivers observe the image of the diaphragm 43 positioned in front of disks 1,2. As a result of the parallax obtained between the two detectors 24.1 and 24.2, the latter see different brightness states. The electric signals supplied by them also have amplitude differences, which can be attributed to the phase displacement of the two signals. The magnitude of the phase displacement can be determined by means of the receiver positions and is constant over the entire rotation range of the rotation angle measuring device. The transillumination of the line disks can also be obtained by two light sources, e.g. juxtaposed LED's, each LED transilluminating the line pattern in a different angle and is then detected by the facing receiver in each case. If only one receiver is used, the light sources can obviously light up in alternating manner and signal processing then takes place in the multiplex process. Even if two receivers are used, a signal separation must be appropriately carried out.

Figure 13:
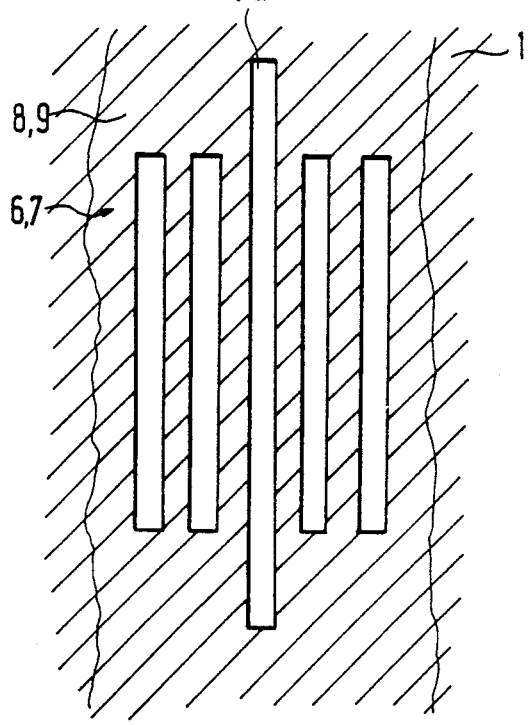
FIG. 13 a diagrammatic detail from the optical grating with a lengthened transparent gap for detecting a mark for determining an absolute rotation angle.

As explained above on blackened disks 1,2 are located transparent gaps 6,7 which are positioned radially to the disk center (e.g. FIG. 8, 10,11). However, the line structure 6,7 does not extend up to the edge and to the center of the disk, so that these areas are opaque. To obtain an absolute mark on the disk—in order to set an incremental counter or the like—a gap 7a is extended towards the center or disk edge (FIG. 13).

Figure 14:
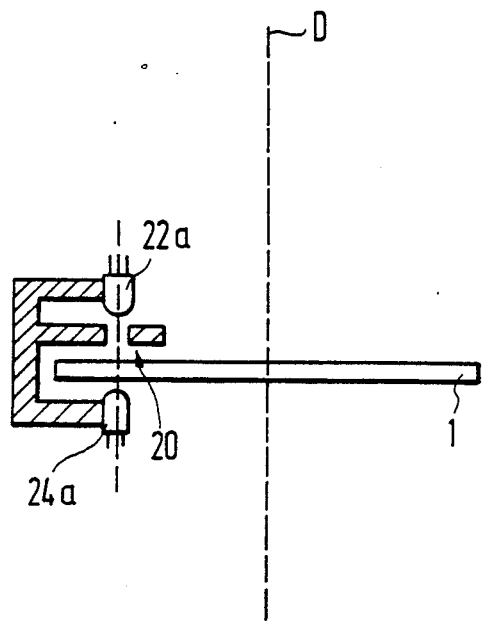
FIG. 14 a detection arrangement for detecting the extended gap.

This extended gap 7a is detected by means of an IR transmitting diode and a photoreceiving device 24a. Infront of the latter is located a circular diaphragm 20 of diameter d, which corresponds to the gap width. All three elements, i.e. transmitting diode 22a, photoreceiving device 24a and perforated diaphragm 20 are mechanically interconnected and can therefore be attached to any point on the circular circumference of the line disk (FIG. 14).

Compared with a slitted diaphragm, the circular diaphragm offers the advantage that it does not have to be adjusted relative to the radial gaps 6,7 on disk 1,2. This further design for fixing a zeropoint or absolute mark on the disk may be provided with all embodiments discussed above, but it requests a further light barrier 24a.

An absolute mark detection or "zeropoint" detection may be provided with the embodiment of FIG. 12 as follows: Through positioning the two photoreceiving devices 24 over the rhomboid figure to be detected (FIG. 12), due to the parallax two analog signals are obtained, which have a reciprocal phase displacement of 90° at A as far as the nondisturbed line structure 6,7 is passed infront of both dectectors 24.1, 24.2.

Figure 15A:
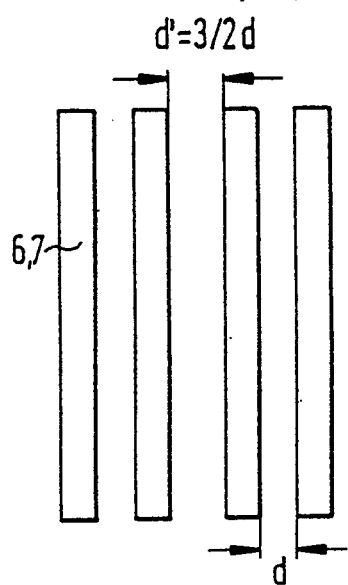
FIG. 15a,b a diagrammatic detail from the optical grating with different grating spacings for eliminating parallax effects.
Figure 15B:
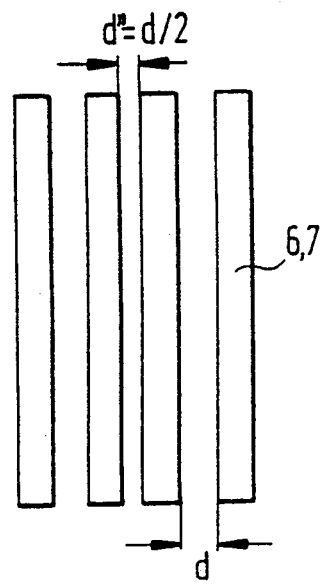
Figure 16:
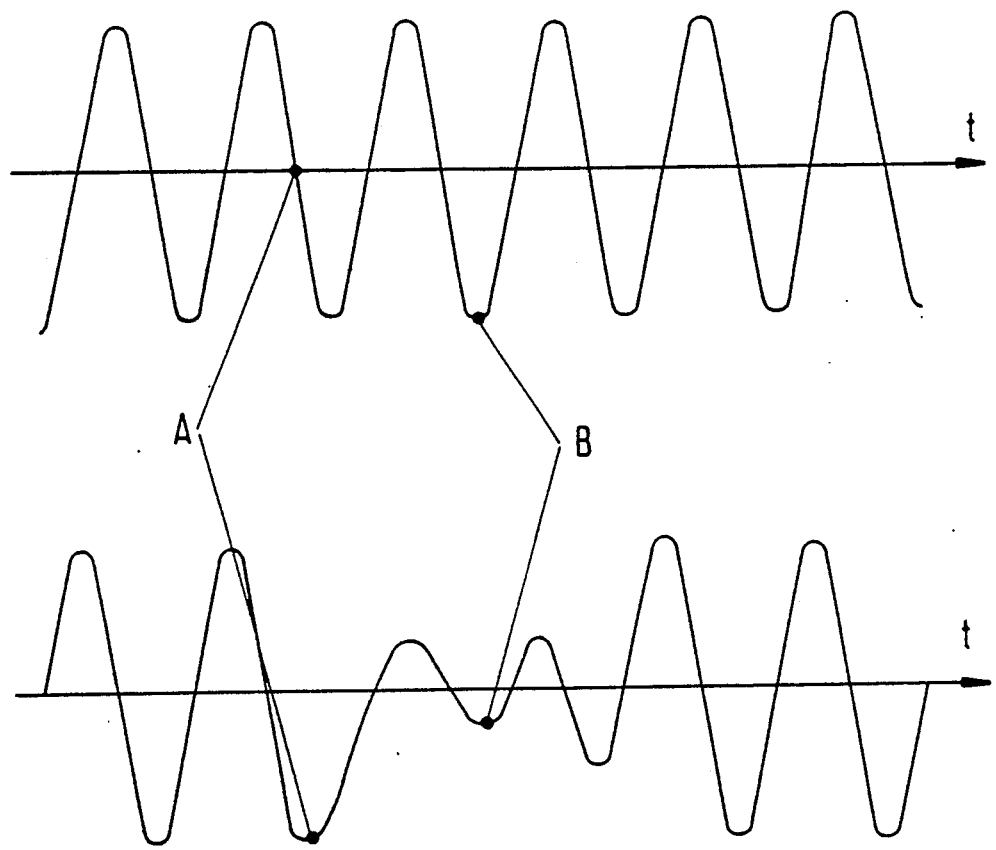

By varying the line and gap spacings, d,d',d" on disk 1,2, the phase displacment of the analog signals resulting from the parallax is eliminated and for this purpose the line structure 6,7 is modified (FIG. 15) accordingly.

If the modified area of the line structure 6,7 on disk 1,2 is detected by one of the photoreceiving device, then the analog signals no longer have any reciprocal phase displacement. The reciprocal phase displacement change occurs gradually.

If the photodetecting device 24 are replaced by detectors with glass fibre pigtails 41, then the phase position change occurs within a few signal periods. There is also a marked reduction of the amplitude response of the analog signals.

By means of a suitable electronic evaluating circuit, a precise mark on the disk can be determined by the phase position or the amplitude response.

The above process offers the advantage that no additional transmitting and receiving elements are required for detecting a mark on the line disk and it is merely necessary to use existing receivers.

We claim:

1. A method for measuring a rotation angle, in which at least one rotatable optical grating is pivoted on a rotation axis relative to one or more slits parallel to the grating, the rotatable optical grating being radial to the rotation axis, wherein the rotatable optical grating is pivoted relative to at least one stationary optical grating which is radial to a center opposite to the center of the rotatable optical grating relative to an overlap area defined by the two optical gratings.

2. A method according to claim 1, wherein a center of the overlap area determined by a connection axis of the centers of both optical gratings is observed by at least one photoelectric receiver.

3. A method according to claim 2, wherein electric output signals of the photoelectric receiver are digitized into digital pulses.

4. A method according to claim 3, wherein the digital pulses received are summated up to an end position of rotary movement to be measured.

5. A method according to claims 3 or 4, wherein the digital pulses are produced by peak values of the output signals of the photoelectric receiver.

6. A method according to one of the claims 3 or 4 wherein the digital pulses are produced by Schmitt triggers determining clearly defined values of the output signals of the photoelectric receiver.

7. A method according to claim 1, wherein a further optical grating coaxial to the rotatable optical grating and which is asymmetrically displaced with respect to the rotatable optical grating, is pivoted synchronously with the rotatable optical grating relative to the stationary optical grating.

8. A method according to claim 7, wherein the further optical grating leads or follows by a ¼ line spacing relative to the rotatable optical grating coaxial thereto.

9. A method according to claim 1, wherein the two optical gratings are observed in different directions.

10. A rotation angle measuring device comprising:
   at least one first pivotable, radial, optical grating through whose center passes a rotation axis, whose angular position is to be measured and with one or more slits positioned upstream of the optical grating; and
   at least one second radial optical grating arranged in a plane parallel to that of the first at least one pivotal, radial, optical grating;
   wherein an overlap area of the two optical gratings is provided, the centers of the two optical gratings being in each case on different sides of the overlap area.

11. A rotation angle measuring device according to claim 10, wherein the two optical gratings are identical.

12. A rotation angle measuring device according to claims 10 or 11, wherein a diaphragm is positioned over the overlap area of the two optical gratings.

13. A rotation angle measuring device according to claim 10, wherein at least on photoelectric receiver is placed over the overlap area of the two optical gratings.

14. A rotation angle measuring device according to claim 13, wherein evaluation electronics follows the photoelectric receiver.

15. A rotation angle measuring device according to claim 14, wherein the evaluation electronics has a device for deriving digital signals from an output signal of the photoelectric receiver.

16. A rotation angle measuring device according to claim 15, wherein the photoelectric receiver is followed by memory circuits.

17. A rotation angle measuring device according to claim 16, wherein determining the positive and negative maxima of the output signal of the photoelectric receiver and by following differential amplifier for forming the difference between the output signal of the hold circuit and the I/U-converted output signal of the photoelectric receiver.

18. A rotation angle measuring device according to claim 10, wherein the at least one first pivotal, radial, optical grating is accompanied by a further optical grating arranged coaxially to the at least one first pivotal, radial, optical grating, but which is angularly asymmetrically displaced relative thereto.

19. A rotation angle measuring device according to claim 18, wherein the at least one first pivotal, radial, optical grating and the further optical grating are reciprocally displaced by ¼ line spacing.

20. A rotation angle measuring device according to claim 10, wherein the two optical gratings are arranged with a reciprocal vertical spacing and that there are at least two receivers or transmitters, one of the two being displaced with respect to the optical axis.

21. A rotation angle measuring device according to claim 20, wherein the relative spacing of the two optical gratings is in the 1/10 mm range.

22. A rotation angle measuring device according to claim 10, wherein optical line markings of the two optical gratings are formed on glass supports.

* * * * *